US012183972B2

(12) United States Patent
Brandenburg et al.

(10) Patent No.: US 12,183,972 B2

(45) Date of Patent: Dec. 31, 2024

(54) THREE-DIMENSIONAL HORN AIR WAVEGUIDE ANTENNA MADE WITH FORMED AND BRAZED METAL SHEETS

(71) Applicant: APTIV TECHNOLOGIES LIMITED, St. Michael (BB)

(72) Inventors: Scott Brandenburg, Kokomo, IN (US); David Zimmerman, Noblesville, IN (US)

(73) Assignee: APTIV TECHNOLOGIES AG, Schaffhausen (CH)

(*) Notice: Subject to any disclaimer, the term of this patent is extended or adjusted under 35 U.S.C. 154(b) by 19 days.

(21) Appl. No.: 17/712,359

(22) Filed: Apr. 4, 2022

(65) Prior Publication Data

US 2023/0318190 A1 Oct. 5, 2023

(51) Int. Cl.
*H01Q 13/02* (2006.01)

(52) U.S. Cl.
CPC ..... *H01Q 13/0283* (2013.01); *H01Q 13/0233* (2013.01)

(58) Field of Classification Search
None
See application file for complete search history.

(56) References Cited

U.S. PATENT DOCUMENTS

| | | | | |
|---|---|---|---|---|
| 5,023,624 | A * | 6/1991 | Heckaman | H01Q 21/0087 333/33 |
| 6,198,456 | B1 * | 3/2001 | Le Halle | H01Q 13/0283 343/774 |
| 7,626,476 | B2 * | 12/2009 | Kim | H01P 3/003 333/33 |
| 9,806,431 | B1 * | 10/2017 | Izadian | H01Q 21/005 |
| 10,992,055 | B2 * | 4/2021 | Hunziker | H01L 24/20 |
| 2015/0349415 | A1 * | 12/2015 | Iwanaka | H01Q 21/064 343/786 |
| 2017/0062931 | A1 * | 3/2017 | Abe | H01Q 5/55 |
| 2020/0076085 | A1 * | 3/2020 | Kamo | H01Q 1/3208 |
| 2020/0176884 | A1 * | 6/2020 | Kirino | H01Q 13/10 |
| 2023/0299506 | A1 * | 9/2023 | Park | H01Q 21/28 343/702 |

FOREIGN PATENT DOCUMENTS

JP 2001044745 A * 2/2001

* cited by examiner

*Primary Examiner* — Dameon E Levi
*Assistant Examiner* — Anh N Ho
(74) *Attorney, Agent, or Firm* — Miller Johnson

(57) ABSTRACT

A three-dimensional (3D) horn air waveguide antenna assembly and its method of manufacture include a bottom stamped metal layer defining a set of electrical connection ports and a plurality of top stamped metal layers arranged atop the bottom stamped metal layer with a brazing material deposited between each stamped metal layer, the plurality of top stamped metal layers defining a channel area proximate to the bottom stamped metal layer, a horn air waveguide antenna area that widens from a bottom portion to a top portion, and a slot area fluidly connecting the channel and horn air waveguide antenna areas.

19 Claims, 10 Drawing Sheets

270

THREE-DIMENSIONAL HORN AIR WAVEGUIDE ANTENNA MADE WITH FORMED AND BRAZED METAL SHEETS

FIELD

The present disclosure generally relates to antenna systems and, more particularly, to a three-dimensional (3D) horn air waveguide antenna made with formed and brazed metal sheets.

BACKGROUND

Slotted waveguide antennas comprise a plurality of slots that act as a directive array antenna for emitting a narrow fan-shaped beam of microwave and ultra-high frequencies (UHF). Some primary advantages of slotted waveguide antennas include size, design simplicity, and convenient adaptation to mass production (e.g., using printed circuit board, or PCB technology). Slotted waveguide antennas, however, also have disadvantages. In particular, slotted waveguide antennas can suffer from undesirable grating lobes in their far-field three-dimensional (3D) patterns, as shown in FIGS. 1A-1B. Thus, while these conventional solutions can sometimes work for their intended purpose, there exists an opportunity for improvement in the relevant art.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

According to one aspect of the present disclosure, a three-dimensional (3D) horn air waveguide antenna assembly is presented. In one exemplary implementation, the assembly comprises: a bottom stamped metal layer defining a set of electrical connection ports, and a plurality of top stamped metal layers arranged atop the bottom stamped metal layer with a brazing material deposited between each stamped metal layer, the plurality of top stamped metal layers defining a channel area proximate to the bottom stamped metal layer, a horn air waveguide antenna area that widens from a bottom portion to a top portion, and a slot area fluidly connecting the channel and horn air waveguide antenna areas.

In some implementations, the plurality of top stamped metal layers comprises, in order from a bottom: a first top stamped metal sheet that is also formed to create the channel and slot areas, and a second top stamped metal sheet defining at least a first portion of the horn air waveguide antenna area. In some implementations, the plurality of top stamped metal layers further comprises, in order from the bottom, a third top stamped metal sheet defining a second portion of the horn air waveguide antenna area. In some implementations, the top portion of the horn air waveguide antenna area is asymmetric. In some implementations, the top portion of the horn air waveguide antenna area is symmetric and the second portion is wider than the first portion to generate a narrower beam width. In some implementations, wherein the second portion of the horn air waveguide antenna area further defines a wider taper. In some implementations, the channel and slot areas defined by the first top stamped metal sheet include distinct first and second channel and slot areas separated by a third alternate channel and slot area, and the horn waveguide antenna area defined by the second top stamped metal sheet includes distinct first and second horn air waveguide antenna areas separated by a slot air waveguide antenna area, wherein the first and second horn air waveguide antenna areas each further define a wider taper at their top portions. In some implementations, the brazing material is an aluminum brazing material. In some implementations, the assembly further comprises: a printed circuit board (PCB) electrically connected to the set of electrical connection ports, and a pressure-sensitive adhesive (PSA) layer disposed between the bottom stamped metal layer and the PCB.

According to another aspect of the present disclosure, a method of manufacturing a 3D horn air waveguide antenna assembly is presented. In one exemplary implementation, the method comprises: forming a bottom stamped metal layer defining a set of electrical connection ports, and forming a plurality of top stamped metal layers arranged atop the bottom stamped metal layer, including depositing a brazing material between each stamped metal layer, the plurality of top stamped metal layers defining a channel area proximate to the bottom stamped metal layer, a horn air waveguide antenna area that widens from a bottom portion to a top portion, and a slot area fluidly connecting the channel and horn air waveguide antenna areas.

In some implementations, the plurality of top stamped metal layers comprises, in order from a bottom: a first top stamped metal sheet that is also formed to create the channel and slot areas, and a second top stamped metal sheet defining at least a first portion of the horn air waveguide antenna area. In some implementations, the plurality of top stamped metal layers further comprises, in order from the bottom, a third top stamped metal sheet defining a second portion of the horn air waveguide antenna area. In some implementations, the top portion of the horn air waveguide antenna area is asymmetric. In some implementations, the top portion of the horn air waveguide antenna area is symmetric and the second portion is wider than the first portion to generate a narrower beam width. In some implementations, the second portion of the horn air waveguide antenna area further defines a wider taper. In some implementations, the channel and slot areas defined by the first top stamped metal sheet include distinct first and second channel and slot areas separated by a third alternate channel and slot area, and the horn waveguide antenna area defined by the second top stamped metal sheet includes distinct first and second horn air waveguide antenna areas separated by a slot air waveguide antenna area, wherein the first and second horn air waveguide antenna areas each further define a wider taper at their top portions. In some implementations, the brazing material is an aluminum brazing material. In some implementations, the method further comprises: providing a PCB electrically connected to the set of electrical connection ports, and providing a PSA layer disposed between the bottom stamped metal layer and the PCB.

In yet another aspect of the present disclosure, a 3D horn air waveguide antenna assembly is presented. In one exemplary implementation, the assembly comprises: a bottom stamped metal layer means for defining a set of electrical connection ports, and a plurality of top stamped metal layer means for arrangement atop the bottom stamped metal layer with a brazing material means for deposition between each stamped metal layer, the plurality of top stamped metal layer means for defining a channel area means proximate to the bottom stamped metal layer means, a horn air waveguide antenna area means that widens from a bottom portion to a top portion, and a slot area means fluidly connecting the channel and horn air waveguide antenna area means. In some implementations, the plurality of top stamped metal layer means is further for arrangement, in order from a bottom: a first top stamped and formed metal sheet means for creating the channel and slot area means, and a second top stamped metal sheet means for defining at least a first portion of the horn air waveguide antenna area means.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1B:
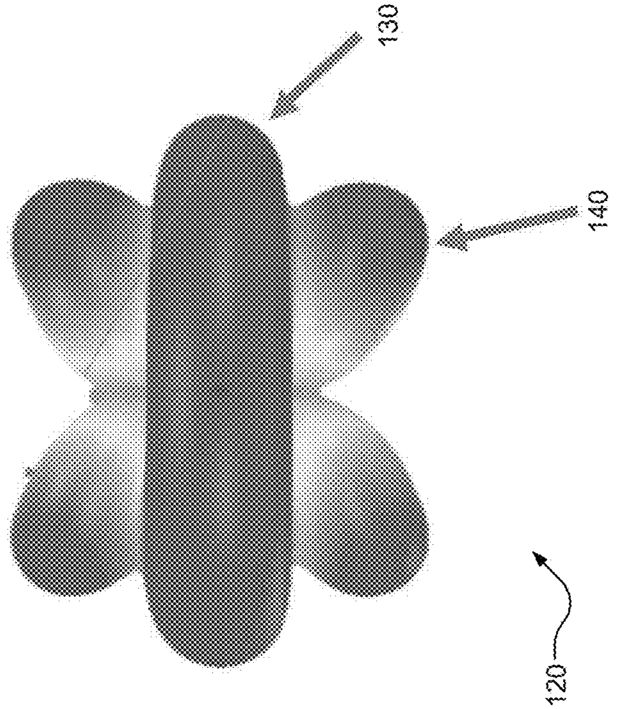
FIGS. 1A-1B illustrate a conventional slotted waveguide antenna assembly and undesirable grating lobes in its far-field three-dimensional (3D) pattern according to the prior art.
Figure 1A:
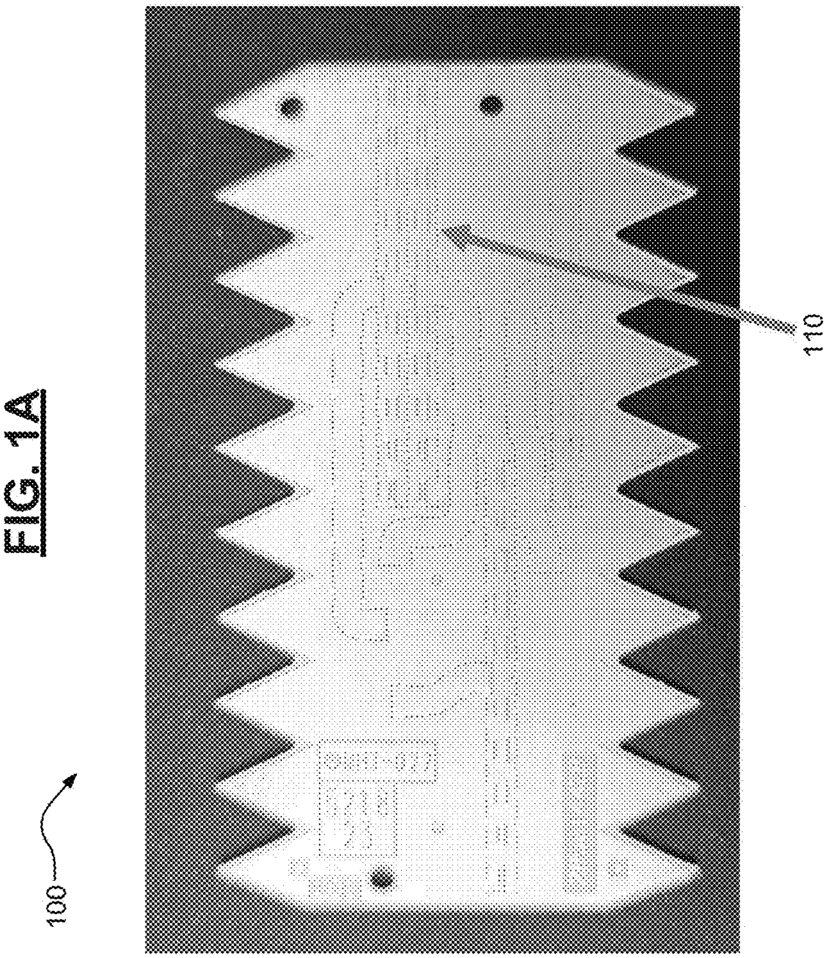

As previously discussed, there exists an opportunity for improvement in the art of waveguide antennas. In particular, slotted waveguide antennas 100 having slot arrays 110 can suffer from undesirable or unintended beams of radiation in their far-field three-dimensional (3D) patterns 120 (i.e., separate from a mean bean 130), which are also known as grating lobes 140 and are shown in FIGS. 1A-1B. When these grating lobes 140 are particularly strong, they act or appear as secondary main lobes or very strong sidelobes, and can result in decreased antenna performance, at least in some implementations or applications (e.g., in performance metrics based on far-field aspects). Therefore, there exists an opportunity for improvement in the relevant art. Another type of antenna is a horn antenna, which is exactly as it describes: a horn-shaped or outwardly flared structure that acts as a waveguide. Horn antennas have no resonant elements and thus have the advantage of being able to operate over a wide bandwidth or range of frequencies (e.g., 10:1, up to 20:1). These horn-shaped structures are traditionally very large and also radiate energy in a spherical wave front shape, thus not providing for a particularly sharp or directive beam.

Accordingly, improved 3D horn air waveguide antenna assemblies formed of stamped metal layers and their methods of manufacture are presented herein. The term "horn air waveguide antenna" as used herein refers to a 3D horn structure formed by layering of stamped metal layers, and does not preclude aspects of a slot array waveguide antenna assembly. In other words, the term "horn air waveguide antenna" can include aspects of a slot array waveguide (e.g., a slot fluidly connecting a channel area to the horn waveguide antenna area), and thus this can also be described as a combination or hybrid slot array waveguide and horn air waveguide antenna assembly configuration (e.g., a slot array waveguide with a horn air waveguide top groove, or the like). By leveraging aspects of multiple different antenna technologies, the resulting antenna assemblies described and illustrated herein are capable of increasing performance metrics while mitigating or eliminating the previously-discussed drawbacks or disadvantages. This can make the antenna assembly configurations described herein ideal for a plurality of potential radar applications, ranging from but not limited to, vehicle applications (e.g., autonomous driving features) to aviation and military applications.

Figure 2A:
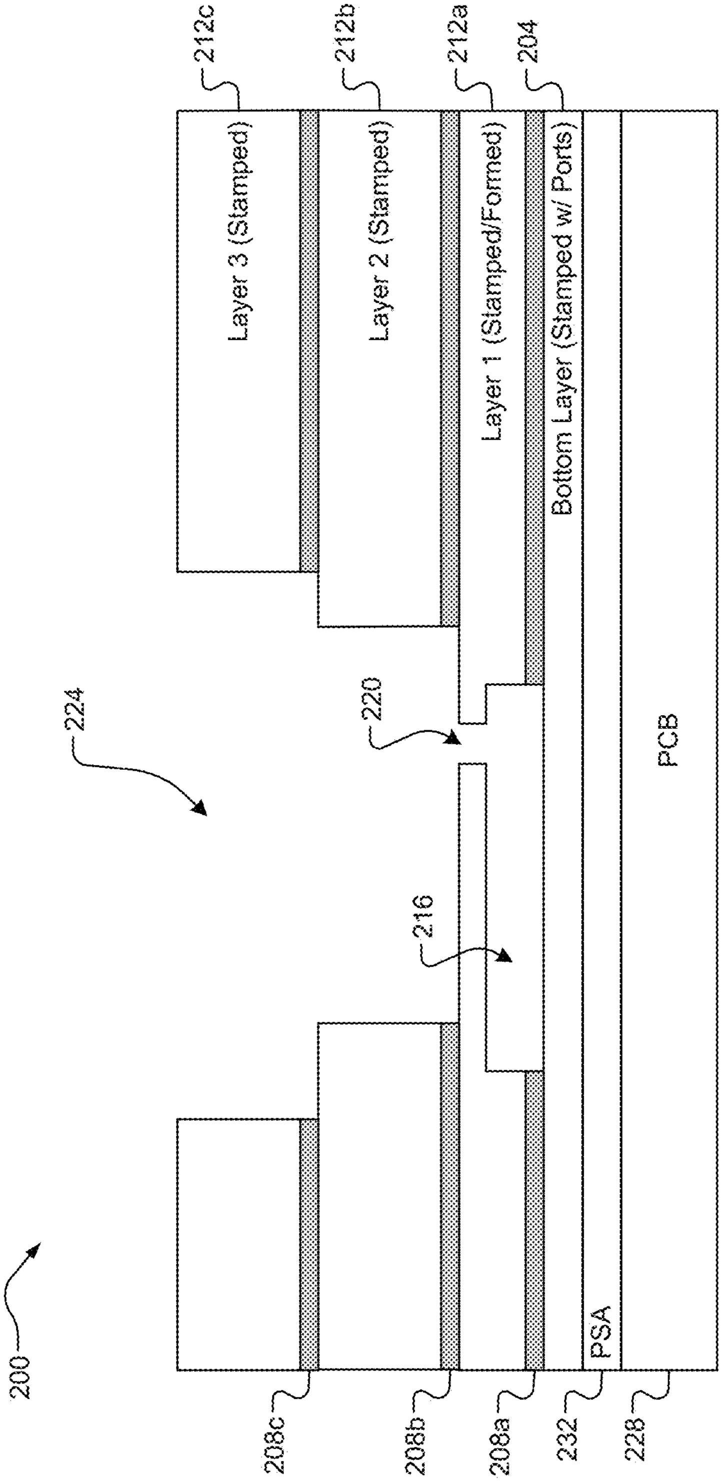
FIGS. 2A-2G illustrate side views and perspective views of various 3D horn air waveguide antenna assembly configurations and corresponding performance metrics according to some implementations of the present disclosure.

Referring now to FIGS. 2A-2G, side views and perspective views of various 3D horn air waveguide antenna assembly configurations and corresponding performance metrics according to some implementations of the present disclosure are illustrated. FIG. 2A illustrates a first configuration 200 of the assembly having a bottom layer 204 and three other layers (e.g., top) **212*a*-212*c* having brazing materials 208*a*-208*c* disposed between each respective layer. While stamped and/or formed aluminum metal layers and aluminum brazing material are primarily described herein due to relatively inexpensive costs, pliability, durability, and electrical performance, it will be appreciated that other metals and/or brazing materials could be utilized. The base layer 204 further defines electrical port(s) for connection to another electrical system (see below). As shown, the first layer 212*a* is stamped/formed to define a channel 216 and a slot 220. The slot fluidly connects (e.g., as an air gap) the channel 216 to a horn air waveguide area 224. A printed circuit board (PCB) for 228 is configured to electrically connect to the bottom layer 204 via the electrical port(s) and control the transmission/reception via the assembly 200. The PCB 228 is attached to the remainder of the assembly via a pressure sensitive adhesive (PSA) pad or layer 232**, which could be flat or could adapt to a curved surface.

Figure 2B:
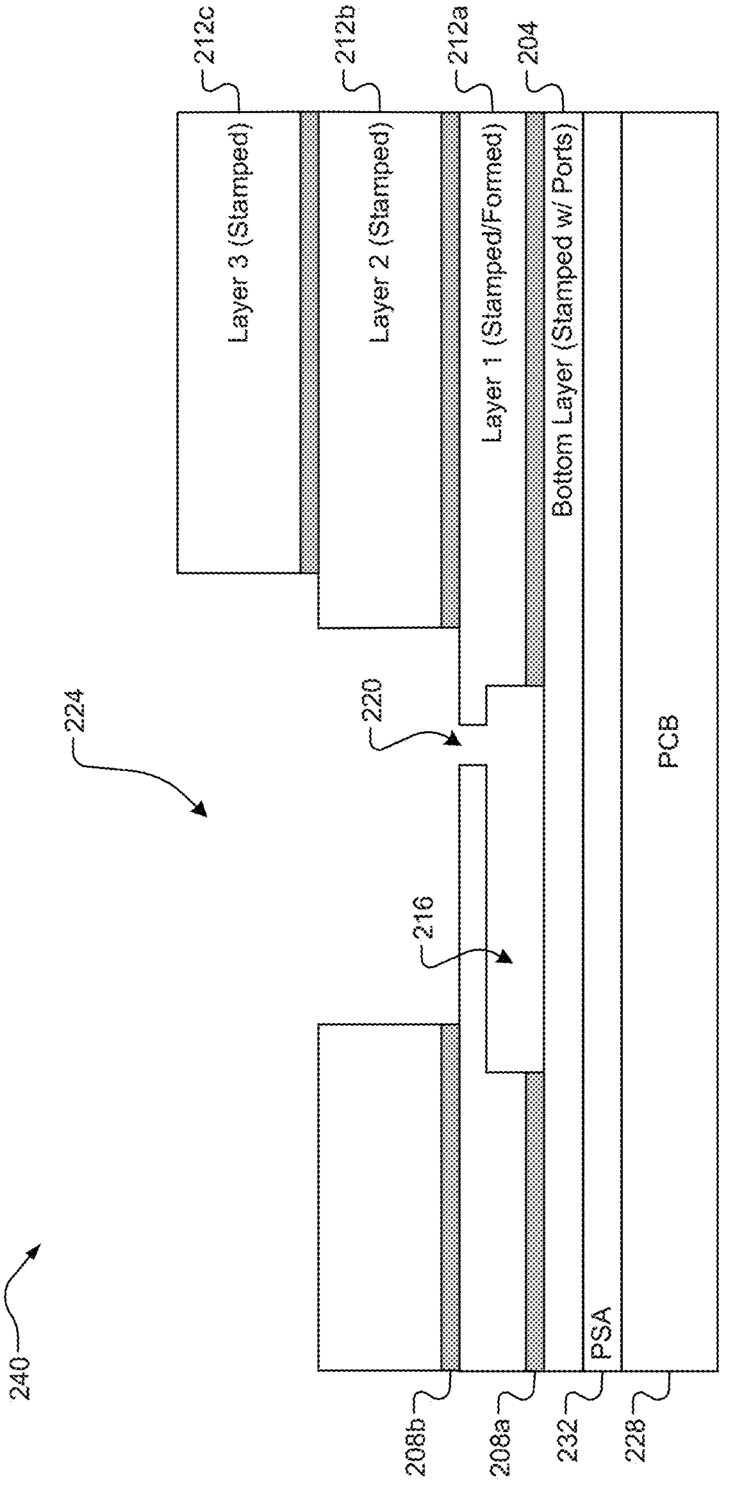
Figure 2C:
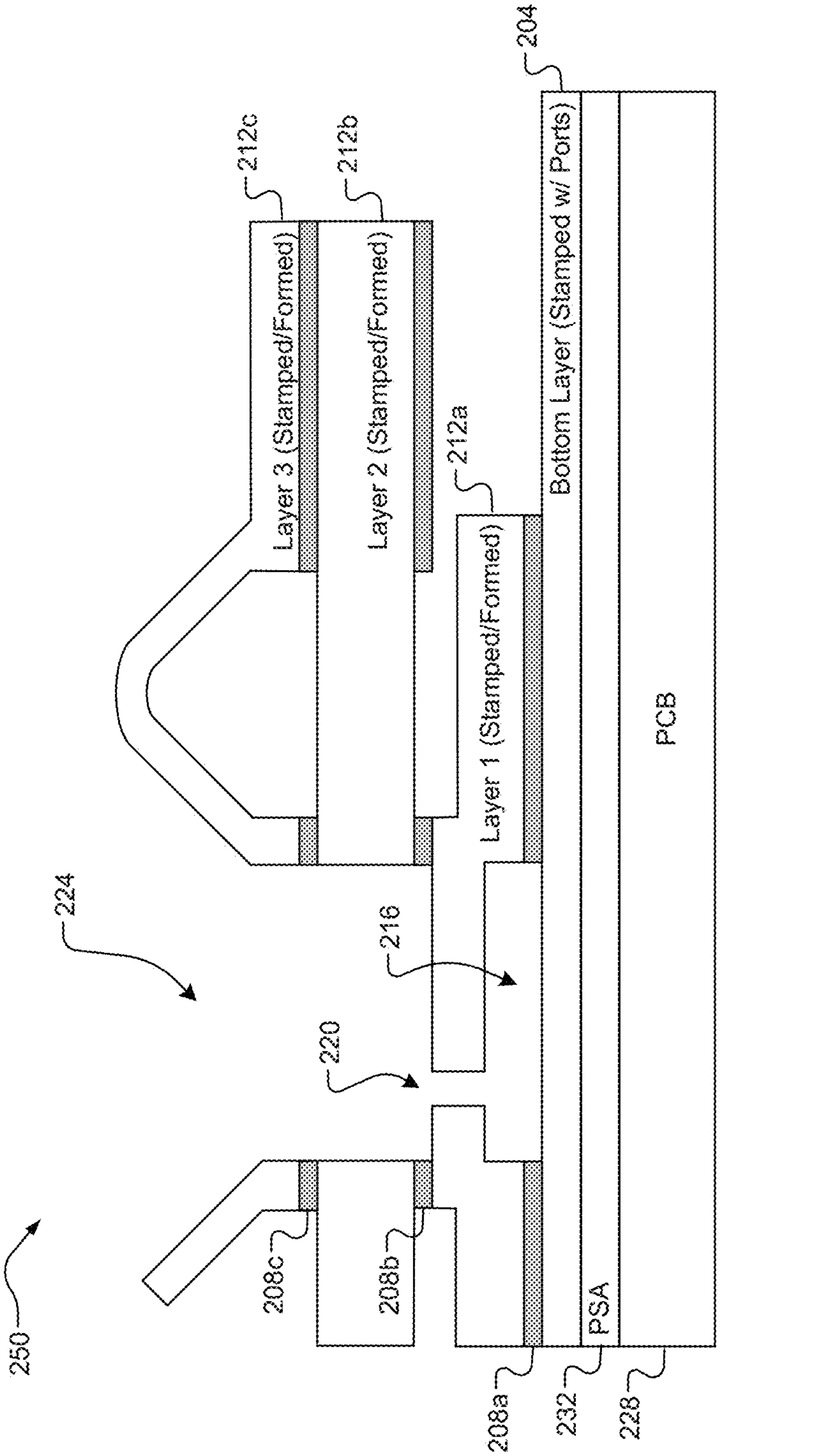
Figure 2D:
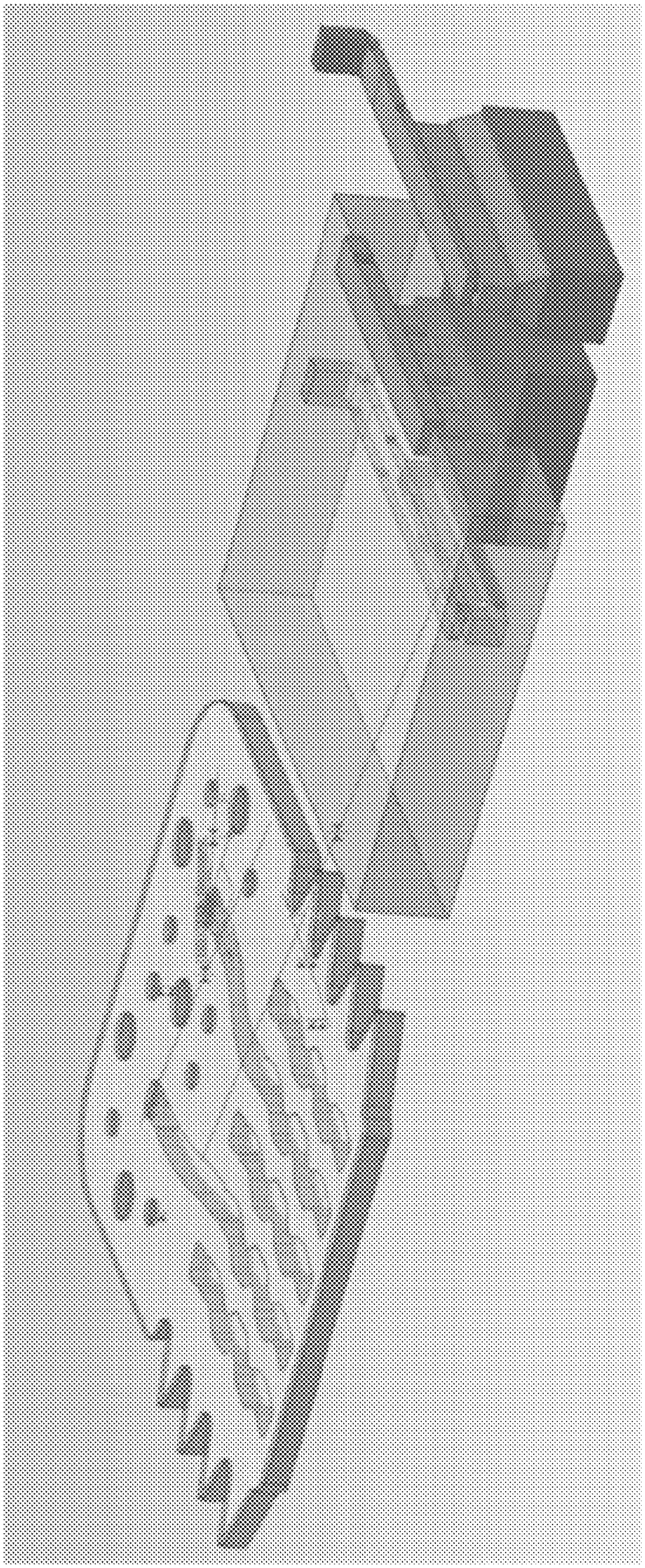
Figure 2E:
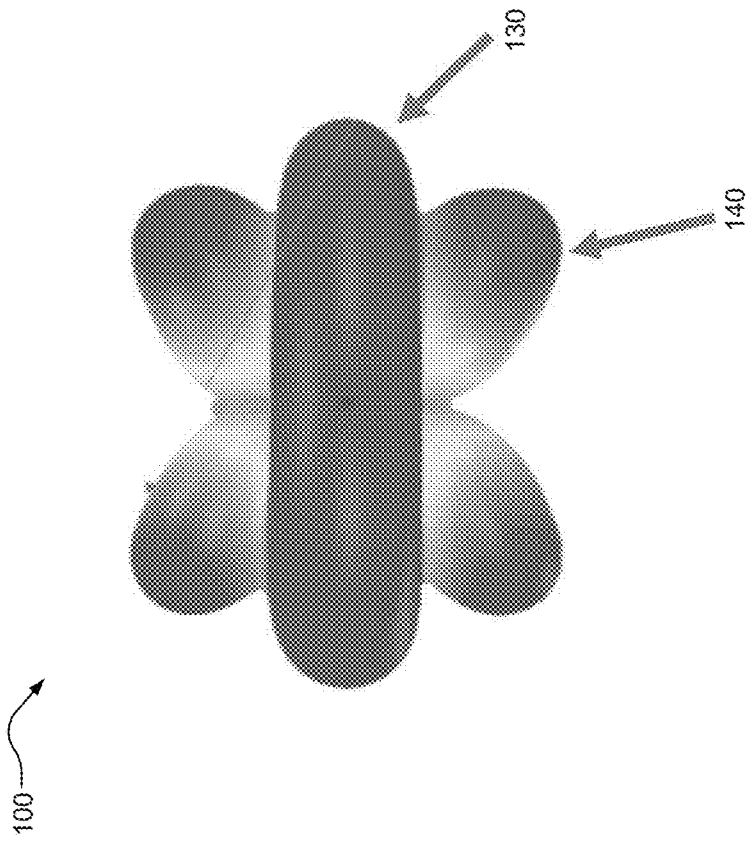
Figure 2F:
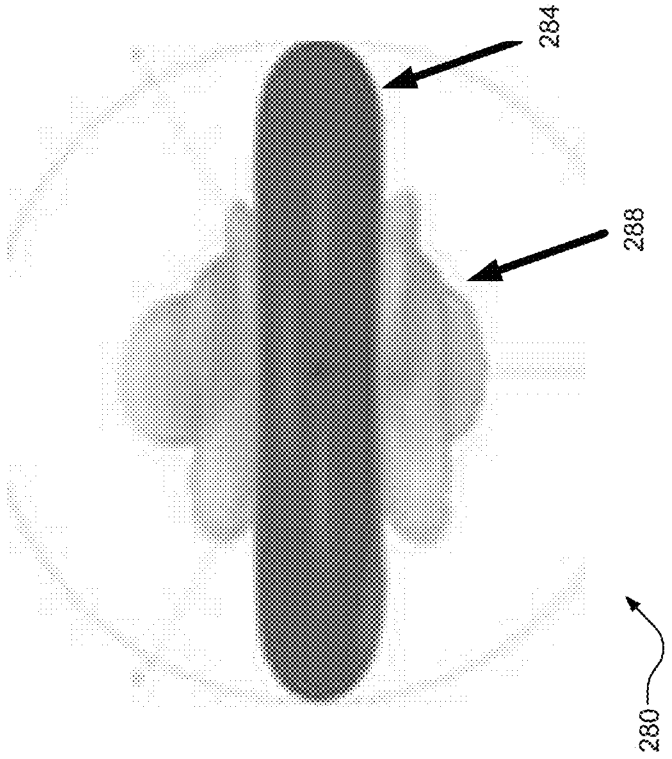
Figure 2G:
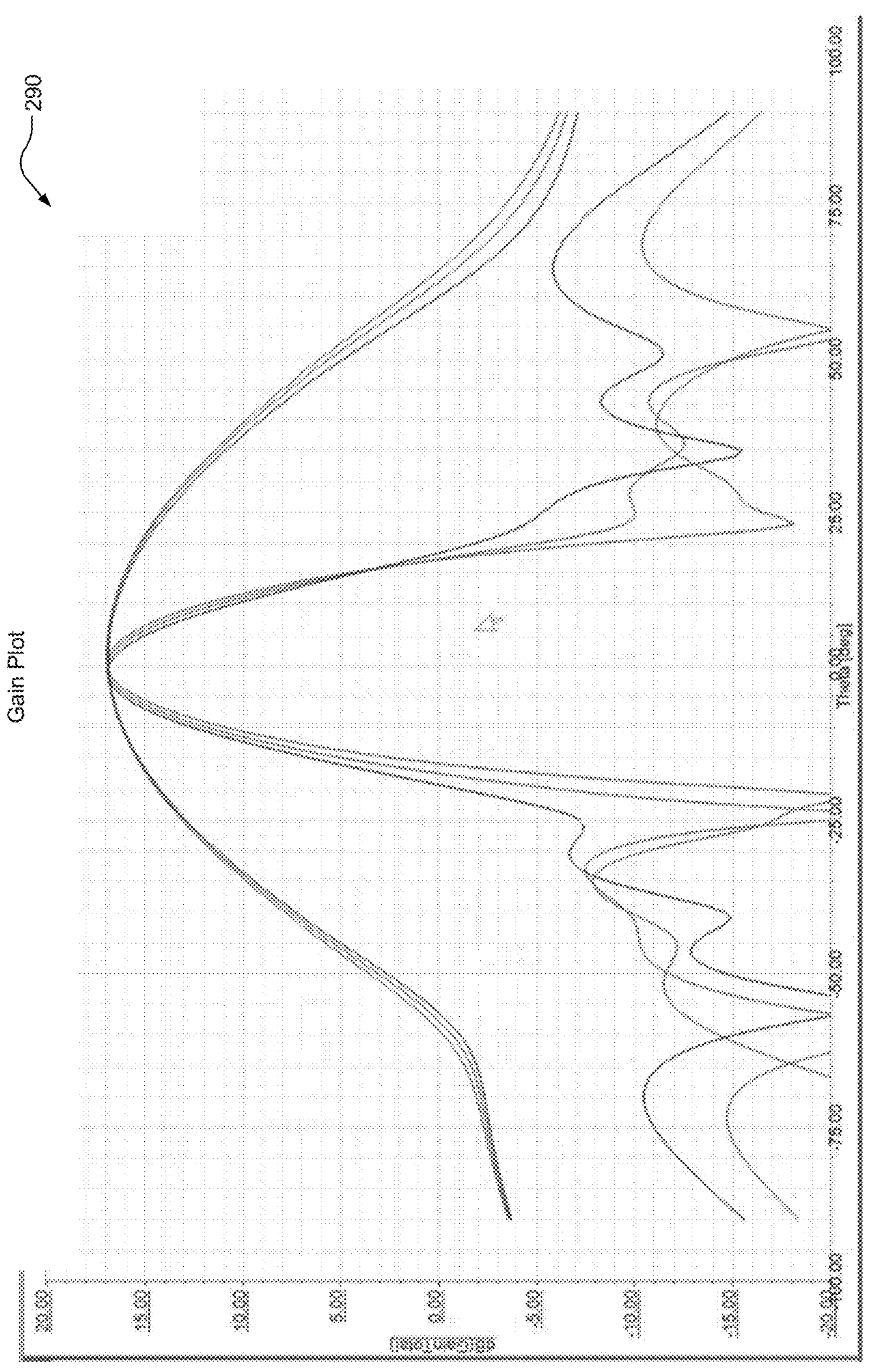

The configuration 200 illustrated in FIG. 2A and other figures is also described as symmetric, whereas an alternate configuration 240 as shown in FIG. 2B is asymmetric such that its top portion (i.e., layer **212*c*) is not the same on both sides of the horn air waveguide area 224. This symmetry (i.e., wider at the top portion) allows for the assembly to generate a narrower beam width for certain applications. The remaining components/layers of FIG. 2B otherwise remain the same as FIG. 2A and as described above, but this asymmetry can alter the functionality of the assembly 240. In FIG. 2C, yet another configuration 250 of the assembly is illustrated and described below. In this configuration 250, a top portion of the assembly defines a wider taper. More specifically, as shown, the third layer 212*c* flares out at a top portion, which is one aspect of a horn-type configuration. FIG. 2D illustrates an example 3D packaging 270 of the above-described and illustrated components, and FIGS. 2E-2G illustrate the improved far-field beam 280 focusing (i.e., lesser or no grating lobes 284 relative to the main beam 284, see right) compared to the prior art (i.e., FIG. 1B, see left) and an example gain plot 290** of these various configurations of the assembly.

Figure 3A:
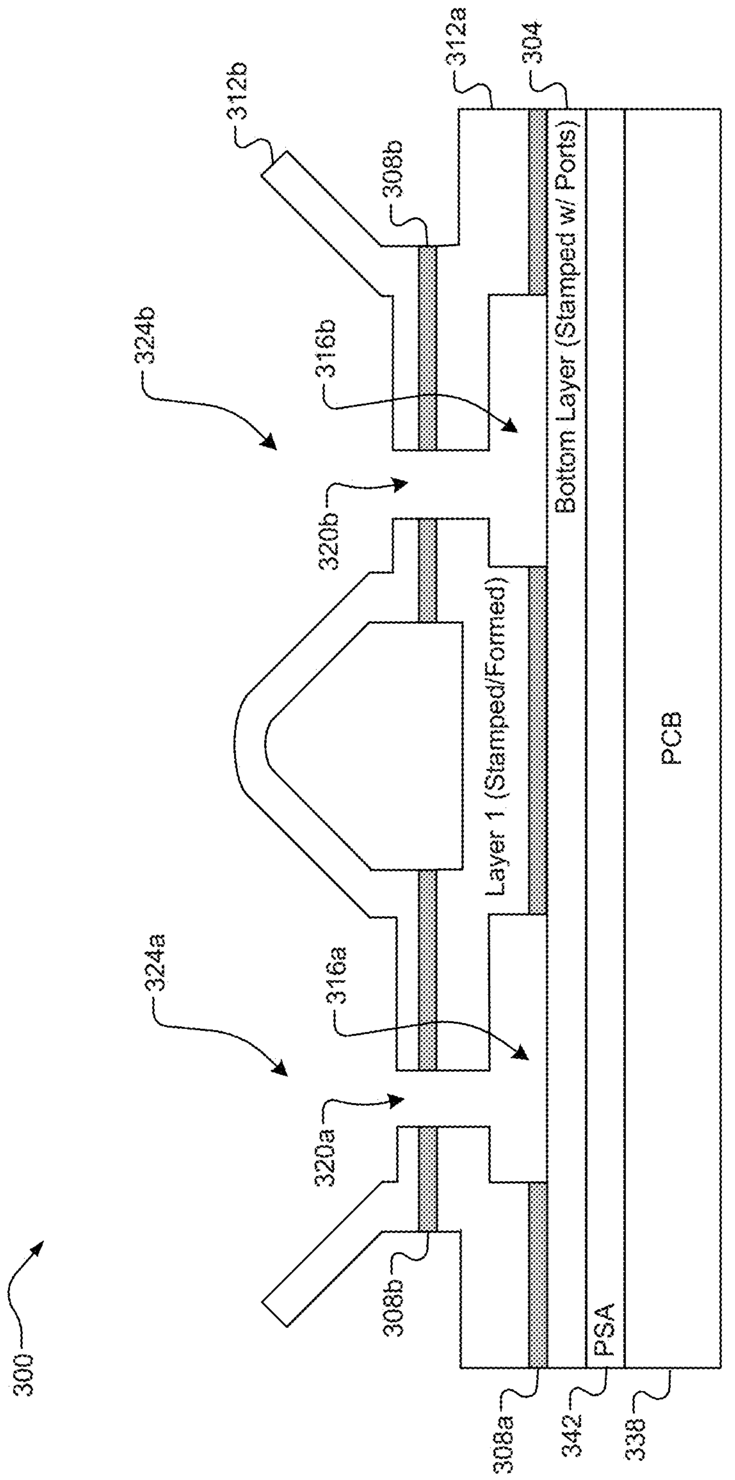
FIGS. 3A-3B illustrate side views of other various 3D horn air waveguide antenna assembly configurations according to some implementations of the present disclosure.
Figure 3B:
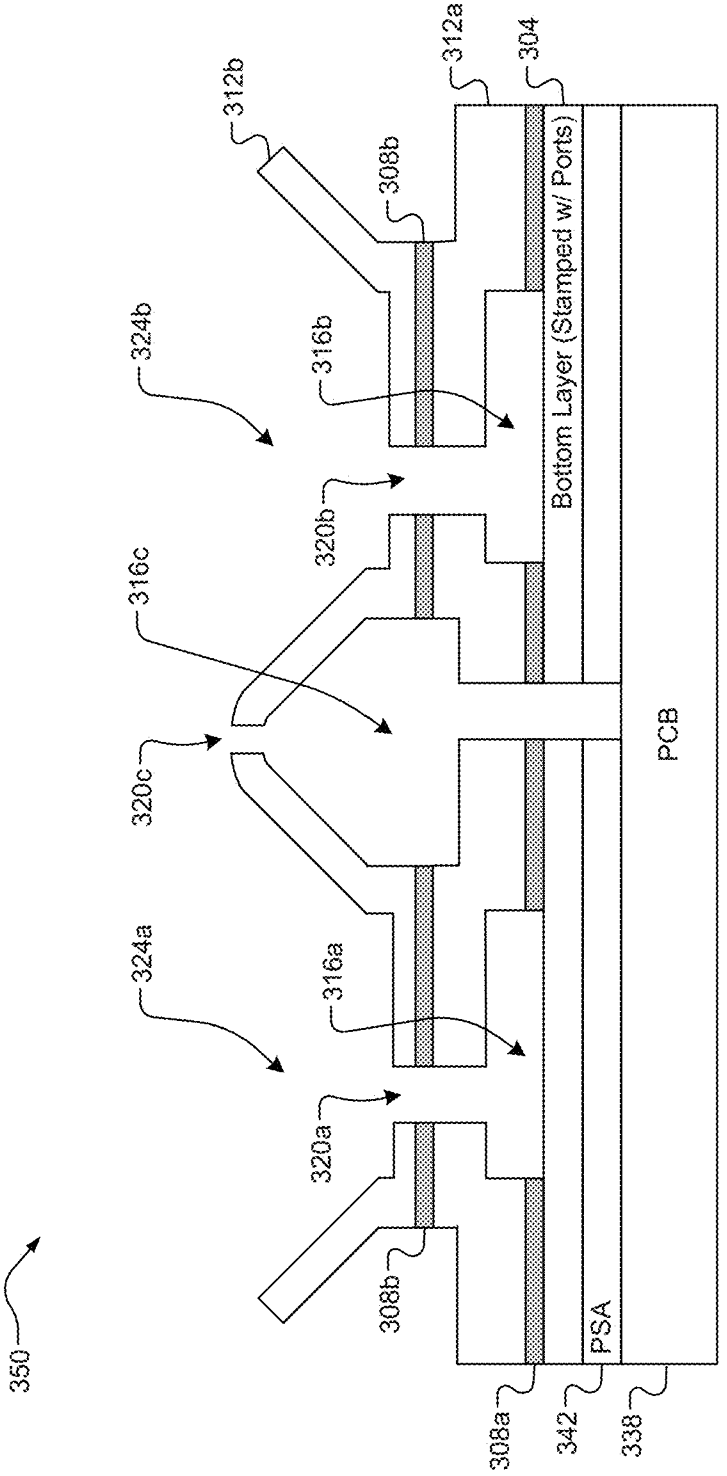

Referring now to FIGS. 3A-3B, yet other configurations 300, 350 having only a stamped/formed base layer 304 with electrical port(s) and two (not three) other stamped/formed layers **312*a*, 312*b* separated by respective brazing layers 308*a*, 308*b* are shown. In both FIGS. 3A and 3B, the channel and slot areas defined include distinct first and second channel and slot areas 316a, 316v and 320a, 320b separated by a third area, which could be configured as a third alternate channel and slot area 316c and 320c as shown in FIG. 3B. Both horn waveguide antenna areas 324a, 324b define a wider taper as previously discussed and illustrated herein, and the assembly is attached to a PCB 338 via a PSA pad or layer 342** similar to the other configurations as previously described and illustrated herein.

Figure 4:
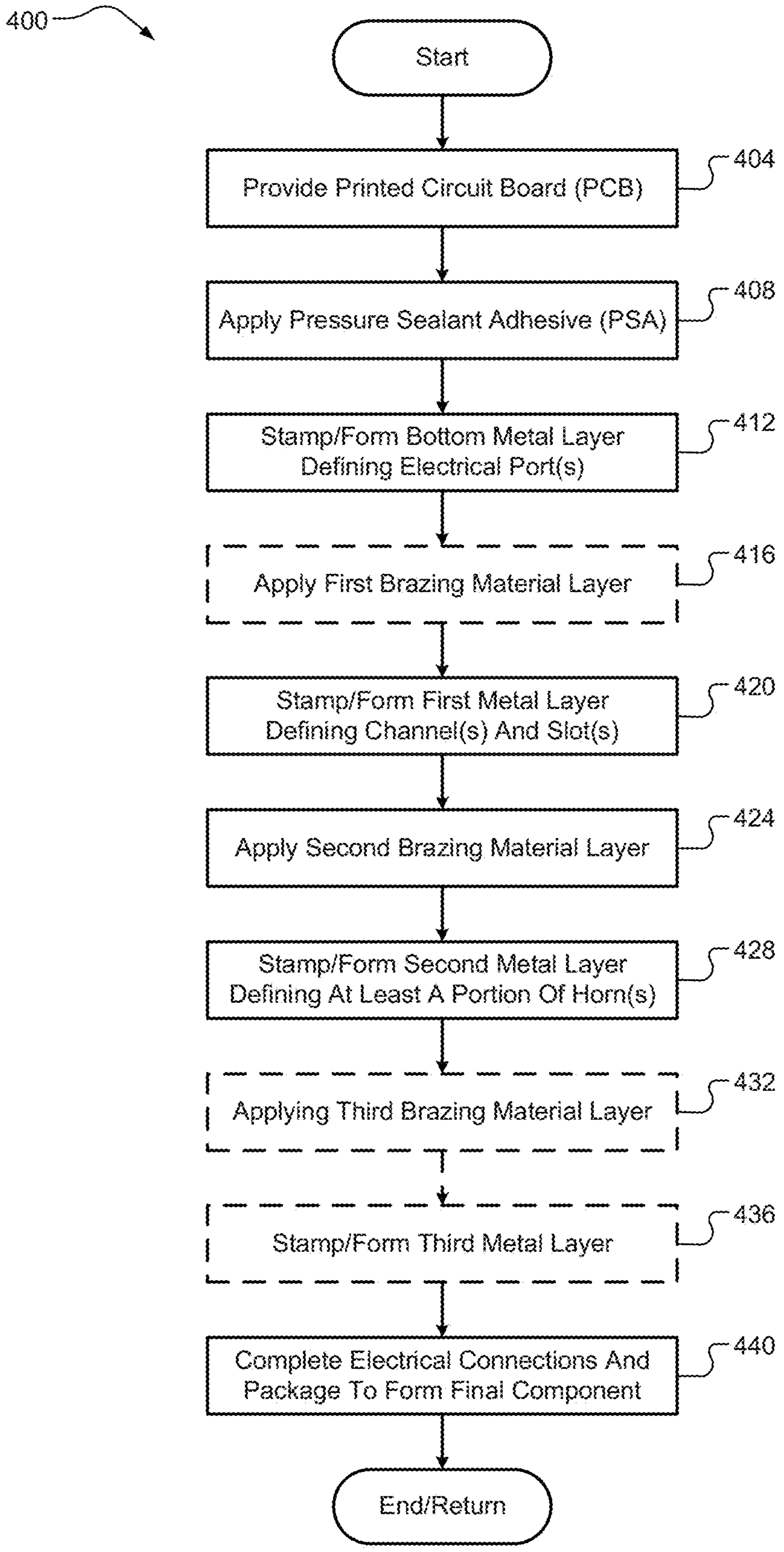
FIG. 4 illustrates a flow diagram of an example method of manufacturing or forming a 3D horn air waveguide antenna according to some implementations of the present disclosure.

Referring now to FIG. 4, a flow diagram of an example method 400 of manufacturing or forming a 3D horn air waveguide antenna according to some implementations of the present disclosure is illustrated. While this method 400 could be utilized to manufacture/form any of the assembly configurations previously discussed and illustrated herein, it will be appreciated that this method 400 could also be applicable to the manufacturing/formation of other suitable assembly configurations. At 404, the PCB is provided. At 408, the PSA pad or layer is applied to the PCB 412. From 412 on, the various components/features of the antenna assembly are formed and attached (e.g., sequentially) to the PCB via the PSA. At 412, the bottom metal layer defining electrical port(s) is stamped and/or formed. At optional 416, an optional first brazing material layer is applied. At 420, the first metal layer is stamped/formed to define the channel(s) and slot(s). At 424, the second brazing material layer is applied. At 428, the second metal layer is stamped/formed to define at least a portion of the horn air waveguide area(s). At optional 432, the third brazing material layer is optionally applied. At optional 436, the third metal layer is optionally stamped/formed (e.g., to complete the formation of the horn air waveguide areas, such as the wider tapered or flared outer portions). At 440, the electrical connections are completed/verified and packaging is finalized to obtain the completed antenna assembly product. The method 400 then ends or returns to 404 for one or more additional cycles.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A three-dimensional (3D) horn air waveguide antenna assembly comprising:

a bottom metal layer;

a first top metal layer arranged atop the bottom metal layer and including a first side and a second side, the first top metal layer defining a slot area; and a second top metal layer arranged atop the first top metal layer, the second top metal layer defining at least a portion of a horn air waveguide antenna area, wherein the bottom metal layer, the first side of the first top metal layer, and the second side of the first top metal layer at least partially define a channel area, wherein the slot area defines a first width and the channel area defines a second width greater than the first width, wherein the channel area is disposed between the bottom metal layer and the slot area, and wherein the slot area fluidly connects the channel area and the horn air waveguide antenna area.

2. The 3D horn air waveguide antenna assembly of claim 1, further comprising a third top metal layer disposed atop the second top metal layer, wherein the second top metal layer defines a first portion of the horn air waveguide antenna area, and the third top metal layer defines a second portion of the horn air waveguide antenna area.

3. The 3D horn air waveguide antenna assembly of claim 2, wherein the second portion of the horn air waveguide antenna area is asymmetric.

4. The 3D horn air waveguide antenna assembly of claim 2, wherein the horn air waveguide antenna area includes a first side and a second side opposite the first side, and wherein the first side and the second side each include the first top metal layer, the second top metal layer and the third top metal layer and the second portion is wider than the first portion to generate a narrower beam width.

5. The 3D horn air waveguide antenna assembly of claim 1, wherein:

the channel and slot areas include distinct first and second channel and slot areas separated by a third alternate channel and slot area; and the horn air waveguide antenna area includes distinct first and second horn air waveguide antenna areas separated by a slot air waveguide antenna area, wherein the first and second horn air waveguide antenna areas each further define a wider taper at their top portions.

6. The 3D horn air waveguide antenna assembly of claim 1, further comprising a brazing material disposed between the first top metal layer and the bottom metal layer.

7. The 3D horn air waveguide antenna assembly of claim 1, further comprising:

a printed circuit board (PCB) electrically connected to the bottom metal layer; and a pressure-sensitive adhesive (PSA) layer disposed between the bottom metal layer and the PCB.

8. The 3D horn air waveguide antenna assembly of claim 1, wherein the first top metal layer includes a first portion and a second portion facing the first portion.

9. The 3D horn air waveguide antenna assembly of claim 6, wherein the brazing material is aluminum.

10. A method of manufacturing a three-dimensional (3D) horn air waveguide antenna assembly, the method comprising:

forming a bottom metal layer;

forming a first top metal layer arranged atop the bottom metal layer and including a first side and a second side, the first top metal layer defining a slot area; and forming a second top metal layer arranged atop the first top metal layer, the second top metal layer defining at least a portion of a horn air waveguide antenna area, wherein the bottom metal layer, the first side of the first top metal layer, and the second side of the first top metal layer at least partially define a channel area, wherein the slot area defines a first width and the channel area defines a second width greater than the first width, wherein the channel area is disposed between the bottom metal layer and the slot area, and wherein the slot area fluidly connects the channel area and the horn air waveguide antenna area.

11. The method of claim 10, further comprising a third top metal layer disposed atop the second top metal layer, wherein the second top metal layer defines a first portion of the horn air waveguide antenna area and the third top metal layer defines a second portion of the horn air waveguide antenna area.

12. The method of claim 11, wherein the second portion of the horn air waveguide antenna area is asymmetric.

13. The method of claim 11, wherein the horn air waveguide antenna area includes a first side and a second side opposite the first side, and wherein the first side and the second side each include the the second top metal layer and the third top metal layer and the second portion is wider than the first portion to generate a narrower beam width.

14. The method of claim 13, wherein the second portion of the horn air waveguide antenna area further defines a wider taper.

15. The method of claim 10, wherein:

the channel and slot areas include distinct first and second channel and slot areas separated by a third alternate channel and slot area; and the horn air waveguide antenna area includes distinct first and second horn air waveguide antenna areas separated by a slot air waveguide antenna area, wherein the first and second horn air waveguide antenna areas each further define a wider taper at their top portions.

16. The method of claim 10, further comprising a brazing material disposed between the first top metal layer and the bottom metal layer.

17. The method of claim 10, further comprising:

providing a printed circuit board (PCB) electrically connected to the bottom metal layer; and providing a pressure-sensitive adhesive (PSA) layer disposed between the bottom metal layer and the PCB.

18. The method of claim 10, wherein the first top metal layer includes a first portion and a second portion facing the first portion.

19. The method of claim 16, wherein the brazing material is aluminum.

* * * * *